(12) United States Patent
Yan et al.

(10) Patent No.: US 7,881,618 B2
(45) Date of Patent: Feb. 1, 2011

(54) SYSTEM AND METHOD FOR M-ARY PHASE-SHIFTING KEYING MODULATION

(75) Inventors: Cishuo Yan, Shanghai (CN); Xinyu Xu, Shanghai (CN); Zhihui Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 743 days.

(21) Appl. No.: 11/759,902

(22) Filed: Jun. 7, 2007

(65) Prior Publication Data

US 2008/0304598 A1  Dec. 11, 2008

(51) Int. Cl.
  H04B 10/12 (2006.01)
  H04B 10/04 (2006.01)
(52) U.S. Cl. .............. 398/185; 398/182; 398/183; 398/186; 398/188; 398/200; 398/201
(58) Field of Classification Search ............... 398/182, 398/183, 185, 186, 188, 200, 201
  See application file for complete search history.

(56) References Cited

U.S. PATENT DOCUMENTS

| | | | |
|---|---|---|---|
| 7,085,500 B2 * | 8/2006 | Spickermann | 398/185 |
| 7,110,681 B1 * | 9/2006 | Mizuochi | 398/183 |
| 2003/0174783 A1 * | 9/2003 | Rahman et al. | 375/298 |

FOREIGN PATENT DOCUMENTS

CN  1949689 A  4/2007

OTHER PUBLICATIONS

Mishina, Ken, et al., "NRZ-OOK-to-RZ-BPSK Modulation-Format Conversion Using SOA-MZI Wavelength Converter", Journal of Lightwave Technology, vol. 24, No. 10, Oct. 2006, pp. 3751-3758.*
Chinese Office Action for Application No. 2010062300188260 mailed Jun. 28, 2010.
Fujita, Takahisa, et al. High Speed Optical DQPSK and FSK Modulation using Integrated Mach-Zehnder Interferometers May 15, 2006.
Yan, Cishuo et al. All-Optical Format Conversation From NRZ to BPSK Using a Single Saturated SOA Nov. 15, 2006.
Kim, Hoon.. Transmission of 8×20 Gb/s DQPSK Signals Over 310-km SMF with 0.8-b/s/Hz Spectral Efficiency May 5, 2003.

* cited by examiner

*Primary Examiner*—Ken N Vanderpuye
*Assistant Examiner*—Daniel G Dobson (57) ABSTRACT

System and method for m-ary phase shifting keying modulation. According to an embodiment, the present invention provides a method for performing m-ary phase-keying shift modulation. The method includes providing at least a first signal and a second signal by a signal source. The first signal and the second signal are characterized by a first signal strength level. The method also includes attenuating the second signal to provide a third signal. The second signal are characterized by a second signal strength level which is at approximate 50% of the first signal strength level. The method additionally includes coupling the first signal to a first bias voltage to provide a fourth signal. Furthermore, the method includes coupling the third signal to a second bias voltage to provide a fifth signal. The method also includes a step for providing a sixth signal by combing the fourth signal and the fifth signal.

24 Claims, 12 Drawing Sheets

SYSTEM AND METHOD FOR M-ARY PHASE-SHIFTING KEYING MODULATION

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to techniques related to communication networks. More specifically, specific embodiments of the present invention are directed to multiple phase-shifting keying modulation. For example, various embodiments of the present invention are used for modulating data for the purpose of transmitting data over optical communication networks. In a specific embodiment, the present invention provides a scheme for quadrature phase-shift keying modulation in an optical network. But it is to be understood that techniques according to the present invention have a broad range of applications. For example, embodiments of the present invention can be used for binary phase-shift keying modulation, higher-order (i.e., eight or higher) phase-shift keying modulation, differential phase-shift keying modulation, and other types of phase-shift keying modulation (e.g., DQPSK, etc.)

Phase-shift keying (PSK) modulation is a widely adopted modulation technique used in various types of communication networks. In particular, PSK modulation method is particularly useful for optical networks. Among other things, PSK modulation allows a signal bandwidth to be narrow, thereby increases transmission efficiency in a cost-effective manner. In addition, PSK modulation is suitable for optical networks because to a large degree it tolerates nonlinearity (e.g., caused by physical properties of optical media) in optical communication networks.

In a PSK modulation scheme, a finite number of phases are used. A unique pattern of binary bit(s) is assigned to each of the phase. For example, in a binary phase-shift keying (BPSK) modulation scheme, two phases separated by $\pi$ are used, and these two represent "0" and "1" respectively. As another example, in a quadrature phase-shift keying (QPSK) modulation scheme, four phases separated by $\pi/2$ are used, and these four phases respectively represent "00", "01", "10", and "11". In higher-order phase-shift keying modulation schemes, more phases separated by smaller interval are used to represent more patterns.

It is often desirable to have PSK modulation scheme to have a large number of phases, as larger number of phases usually mean that each individual phase can be used to represent more bits. For example, in a BPSK modulation scheme, each phase represents one bit. In contrast, in a QPSK modulation scheme, each phase represents two bits, and so on and so forth. Other things being equal, by using QPSK instead of BPSK, the rate of data transmission can be greatly improved, which can be as much as being doubled.

Figure 1:
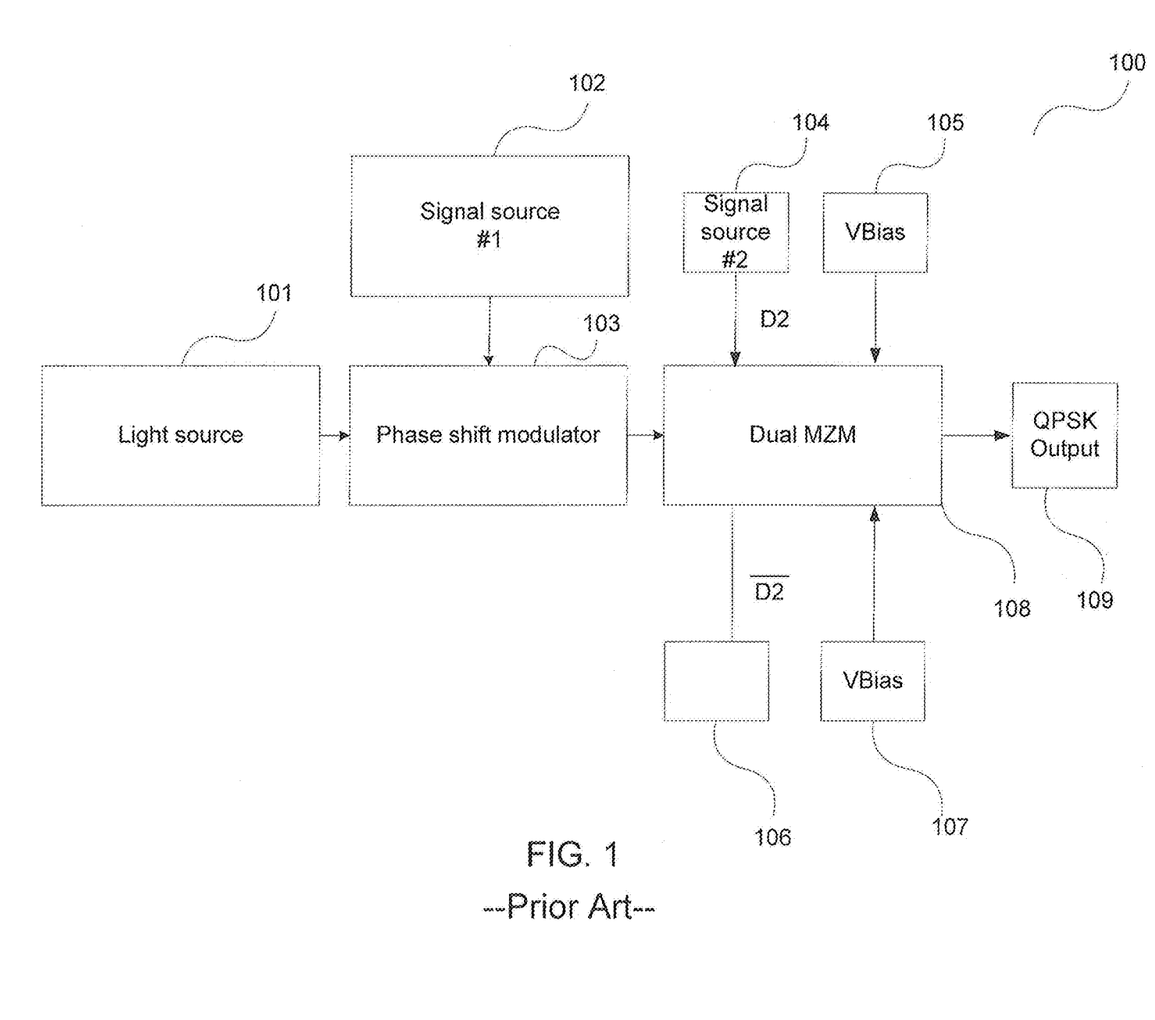
FIG. 1 is a simplified diagram illustrating a conventional optical QPSK system.

Over the past, various conventional techniques have been developed to implement QPSK modulation schemes in optical networks. For example, Alcatel-Lucent in the United States developed an optical QPSK system. FIG. 1 is a simplified diagram illustrating a conventional optical QPSK system.

As shown in FIG. 1, a conventional optical QPSK system 100 as developed by Alcatel-Lucent includes the following components:

1. a light source 101;
2. signal sources 102, 104, and 106;
3. a phase-shift modulator 103;
4. voltage sources 105 and 107;
5. a Mach-Zehnder modulator 108; and
6. an output 109.

Figure 2:
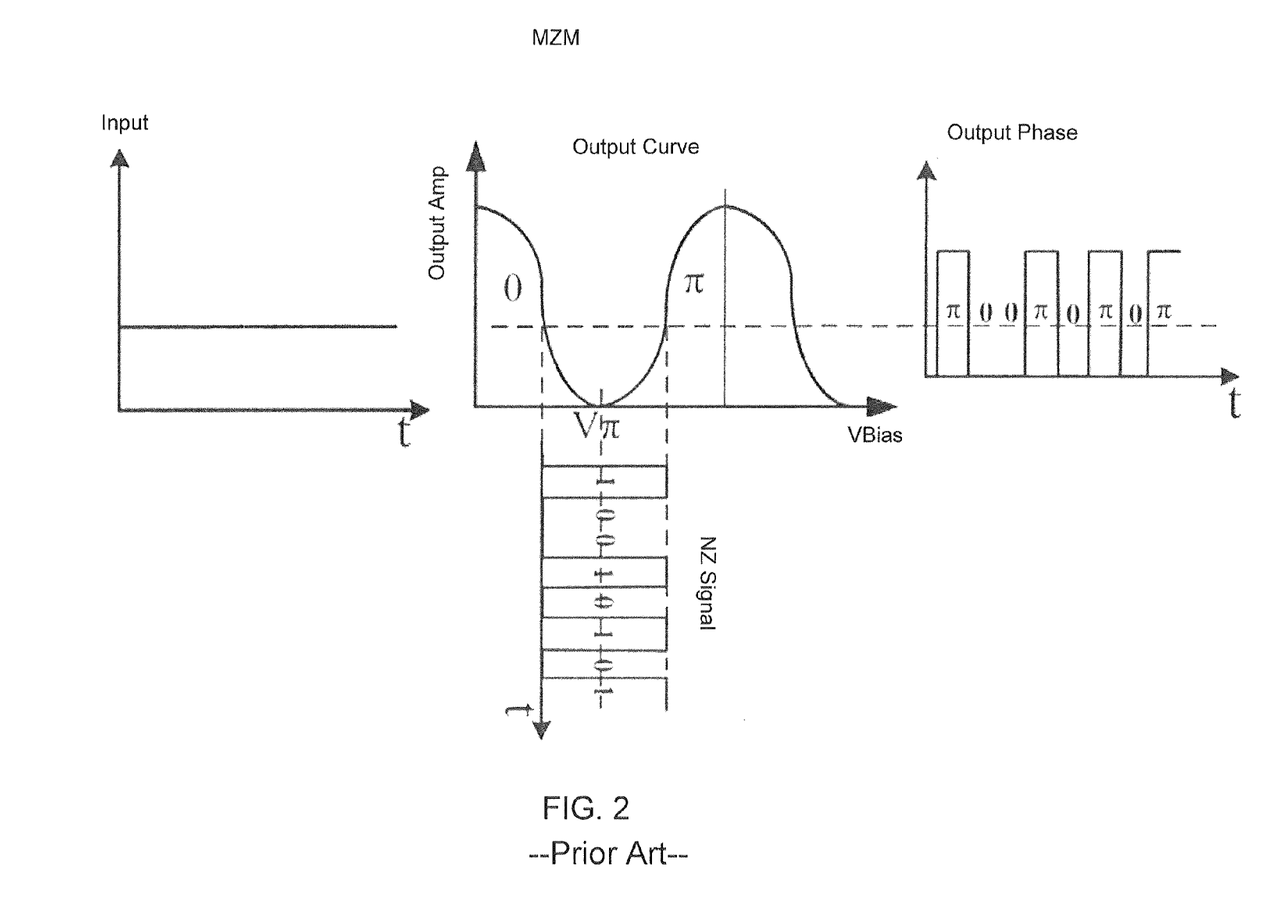
FIG. 2 is a collection of graphs illustrating the operation of the system 100.

During operation, the light source 101 generates a light signal (e.g., a laser light signal) and sends the signal to the modulator 103. The modulator 103 modulates the received light signal using data signals generated by the signal source 102. After modulation by the modulator 103, the light signal contains information that is represented by two possible phases: 0 and $\pi/2$. The modulator 103 sends the modulated light signal to the Mach-Zehnder modulator (MZM) 108. Usually, for the MZM 108 to work for this conventional system, the MZM is a dual arm MZM apparatus. In addition to the modulated light signal, the MZM 108 also receives four additional inputs: two data signals that are compliment of each other and two voltages. Using the two complimentary data signals, the MZM 108 modulates the already modulated light signal for the second time. Typically, the two voltages are biased at a low voltage level that is associated with the modulator 108, thereby allowing the modulator 108 to modulate the already modulated data signal. As an example, FIG. 2 is a collection of graphs illustrating the operation of the system 100.

Figure 3:
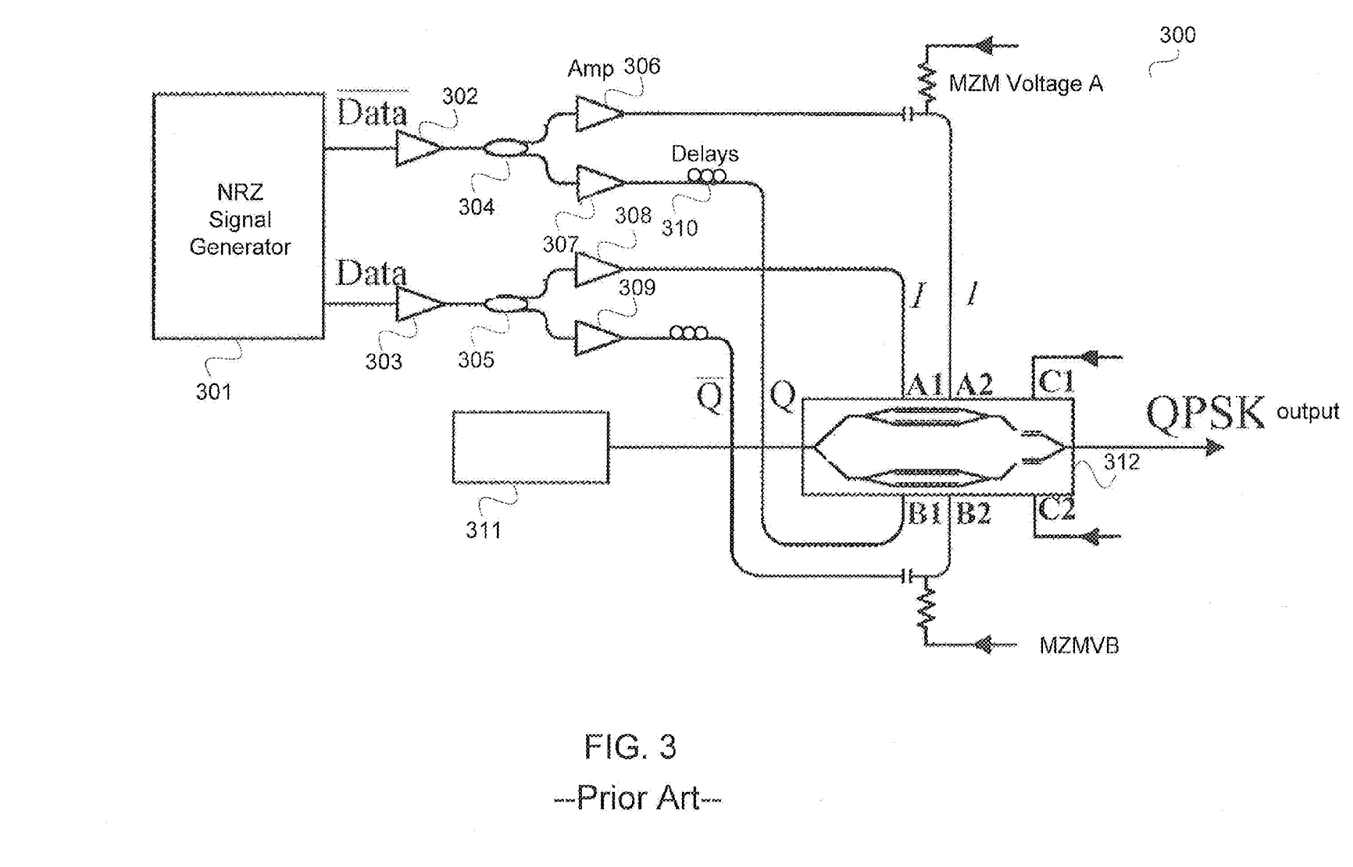
FIG. 3 is a simplified diagram illustrating a conventional QPSK modulation device for data transmission over optical networks.

The conventional system 100 is operational in various aspects, and it is only one of many conventional QPSK systems that is available. For example, Japan's Institute for Information and Communication has provided another QPSK system for providing modulation in an optical communication network. FIG. 3 is a simplified diagram illustrating a conventional QPSK modulation device for data transmission over optical networks. For example, the conventional QPSK modulation system 300 is a QPSK system developed by the Japan's Institute for Information and Communication.

As shown in FIG. 3, the system 300 includes the following components:

1. a non-return to zero (NRZ) signal generator 301;
2. amplifiers 302, 303, 306, 307, 308, and 309;
3. splitters 304 and 305;
4. delay components 310;
5. voltage sources 312 and 313;
6. modulator 315;
7. light source 311; and
8. output 316.

The generator 301 provides two NRZ data signals that are complimentary to each other. The two NRZ data signals are then amplified by amplifiers 302 and 303 respectively. Usually, the amplifiers 302 and 303 are independent and have different gain factors. The amplified data signals are then split into two set of signals by splitters 304 and 305 respectively. Each set of signals are separately amplified again by individual amplifiers. One of the signals from each set of signals is then delayed by the delaying component. Four signals, two delayed and two undelayed signals, are then sent to the modulator 312. In addition to the received signals, the modulator receives bias voltage inputs. Using the four signals and bias voltage, the modulator 312 generates a QPSK modulated signal.

Figure 4:
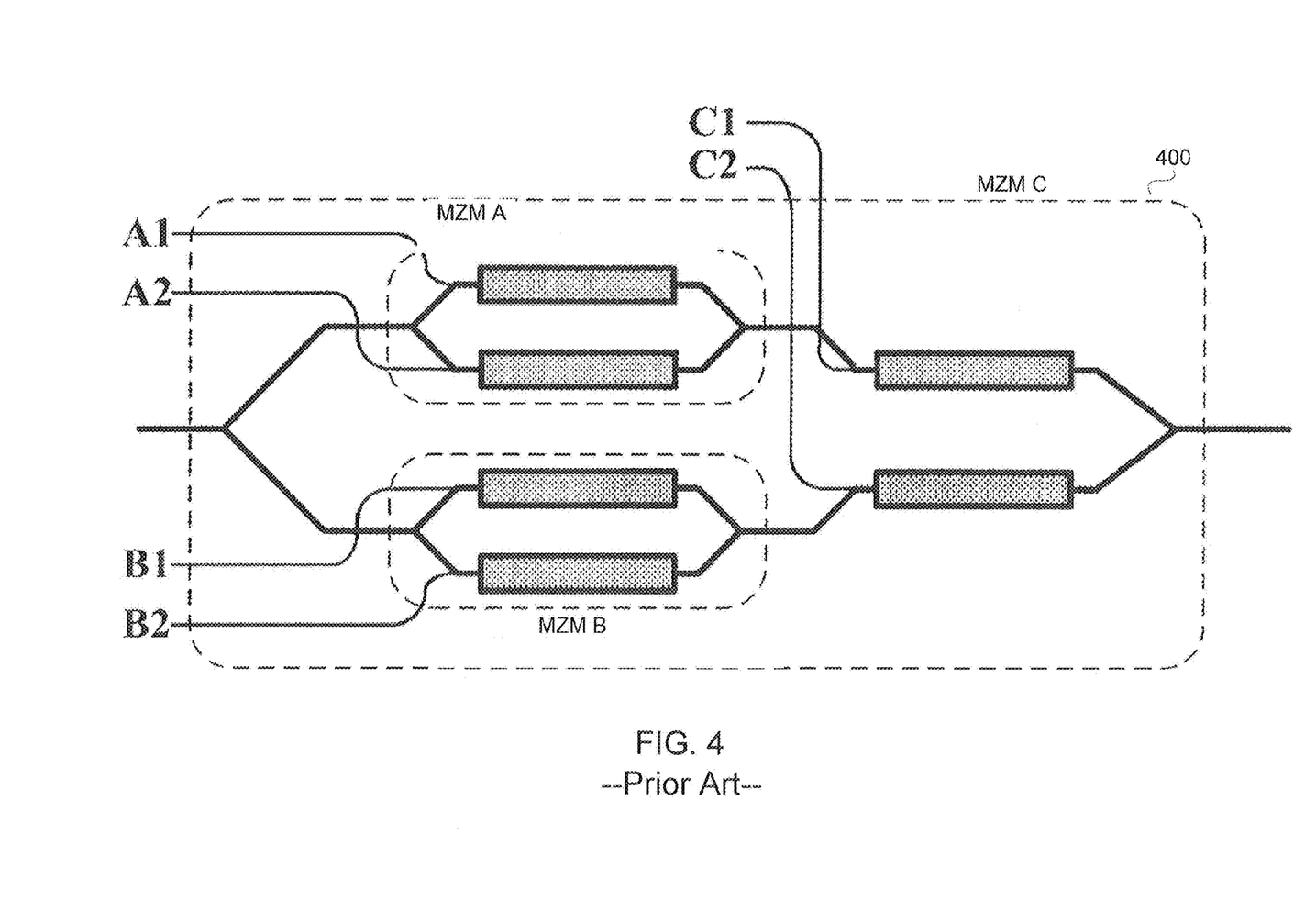
FIG. 4 is a simplified diagram illustrating a conventional combinational MZM modulator.

Depending upon application, modulator 312 may be implemented in various ways. For example, FIG. 4 is a simplified diagram illustrating a conventional combinational MZM modulator. As an example, the modulator 400 is used in the system 300. With four signal inputs, the modulator 400 uses two signals for phase modulation at half phase level, and uses the other two signals for phase modulation at quarter phase level. In comparison to the system 100, the system 300 has various advantages. Among other things, the system 300 provides a multitude of possibilities for external controls.

While conventional systems and techniques, such as ones explained above, are usable for various applications, they are often inadequate for various reasons, which are detailed below.

Therefore, it is desirable to have an improved system and method for m-ary PSK modulation.

BRIEF SUMMARY OF THE INVENTION

The present invention is directed to techniques related to communication networks. More specifically, specific embodiments of the present invention are directed to multiple phase-shifting keying modulations. For example, various embodiments of the present invention are used for modulating data for the purpose of transmitting data over optical communication networks. In a specific embodiment, the present invention provides a scheme for quadrature phase-shift keying modulation in an optical network. But it is to be understood that techniques according to the present invention have a broad range of applications. For example, embodiments of the present invention can be used for binary phase-shift keying modulation, higher-order (i.e., eight or higher) phase-shift keying modulation, differential phase-shift keying modulation, and other types of phase-shift keying modulation (e.g., DQPSK, etc.).

According to an embodiment, the present invention provides a method for performing m-ary phase-keying shift modulation. The method includes providing at least a first signal and a second signal by a signal source. The first signal and the second signal are characterized by a first signal strength level. The method also includes attenuating the second signal to provide a third signal. The second signal is characterized by a second signal strength level which is at approximate 50% of the first signal strength level. The method additionally includes coupling the first signal to a first bias voltage to provide a fourth signal. Furthermore, the method includes coupling the third signal to a second bias voltage to provide a fifth signal. The method also includes a step for providing a sixth signal by combing the fourth signal and the fifth signal. Also, the method also includes providing a light. In addition, the method includes a step for providing a multi-level modulated light signal by performing amplitude modulation on the light. The modulation is associated with at least the sixth signal. Furthermore, the method includes a step for performing phase-shift keying modulation on the amplitude-modulated light signal using an optical amplifier. The nonlinear optical amplifier is characterized by an amplitude/phase characteristic.

According to an embodiment, the present invention provides a system for performing m-ary phase-shift keying modulation. The system includes a signal source that is configured to generate at least a first signal and a second signal. The first signal and the second signal are characterized by a first signal strength level. The system additionally includes a signal attenuator that is configured to generate a third signal by attenuating the second signal, which is characterized by a second signal strength level. For example, the second signal strength level is at approximate 50% of the first signal strength level. The system also includes a voltage adjustment component that is configured to provide a fourth signal by coupling the first signal by a first bias voltage and to provide a fifth signal by coupling the third signal by a second bias voltage. In addition, the system includes a voltage combining component that is configured to provide a sixth signal by combing the fourth signal and the fifth signal. The system additionally includes a light source that is configured to providing a light. Furthermore, the system includes a modulation component that is configured to provide a modulated light signal by performing amplitude modulation on the light. For example, the modulation is associated at with at least the sixth signal. Also, the method includes an optical amplifier that is configured to perform phase-shift keying modulation on the modulated light signal and to output an m-ary phase-key modulated optical signal, which is characterized by an amplitude/phase characteristic.

According to yet another embodiment, the present invention provides a system for performing m-ary phase-shift keying modulation. The system includes a signal source that is configured to generate at least a first signal and a second signal. The first signal and the second signal are characterized by first signal strength level. The system also includes a signal attenuator that is configured to generate a third signal by attenuating the second signal, which is characterized by a second signal strength level. For example, the strength of the second signal is approximate 50% of that of the first signal. The system additionally includes a voltage adjustment component that is configured to provide a fourth signal by coupling the first signal by a first bias voltage and to provide a fifth signal by coupling the third signal by a second bias voltage. Furthermore, the system includes a voltage combining component that is configured to provide a sixth signal by combining the fourth signal and the fifth signal. Additionally, the system includes a signal amplifier that is configured to amplify the sixth signal at a amplification level, which is associated with the modulation component. Also, the system includes a light source being configured to provide light. Furthermore, the system includes a modulation component that is configured to provide a modulated light signal by performing amplitude modulation on the light, the modulation being associated at with at least the sixth signal. Moreover, the system includes an optical attenuator being configured to attenuate the modulated light signal. Also, the system includes an optical amplifier that is configured to perform phase-shift keying modulation and erase the amplitude information of the modulated light signal and to output an m-ary phase-key modulated optical signal.

It is to be appreciated that various embodiments of the present invention provides various advantages over conventional techniques. Among other things, various embodiments of the present invention use fewer components when compared to conventional systems, thereby reduces the costs and complexity of the system implementation. For example, systems implemented according to embodiments of the present invention use fewer numbers of modulators when compared to conventional systems. Also, the present invention provides flexible embodiments that allow high-order PSK modulation to be implemented along the same methodology. Moreover, embodiments of the present invention are compatible with conventional systems and methods. There are other advantages as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to techniques related to communication networks. More specifically, specific embodiments of the present invention are directed to multiple phase-shifting keying modulation. For example, various embodiments of the present invention are used for modulating data for the purpose of transmitting data over optical communication networks. In a specific embodiment, the present invention provides a scheme for quadrature phase-shift keying modulation in an optical network. But it is to be understood that techniques according to the present invention have a broad range of applications. For example, embodiments of the present invention can be used for binary phase-shift keying modulation, higher-order (i.e., eight or higher) phase-shift keying modulation, differential phase-shift keying modulation, and other types of phase-shift keying modulation (e.g., DQPSK, etc.).

As explained, conventional PSK modulation system are often inadequate for various reasons. For example, the system 100 as illustrated in FIG. 1 has certain drawbacks. Among other things, the use of the dual drive MZM 108 renders the system 100 expensive and difficult to operate in practice. Usually, high level data accuracies are required for components for the system 100, thereby imposing high costs on these components. Additionally, since signals are twice modulated, the modulated PSK signal often needs amplification and synchronization.

The conventional system 300 is not without drawbacks itself. The modulator that is used by the system 300 is often expensive and complex. In addition, since the modulator uses multiple MZM devices, the system 300 is implemented with a high degree of complexity to ensure that the MZM devices are synchronized properly. Moreover, since the output of the modulator 316 is typically weak, additional amplification is typically required.

Therefore, it is to be appreciated that various embodiments of the present invention provide cost-effective, efficient, and flexible system and method for performing m-ary PSK modulation.

Figure 5:
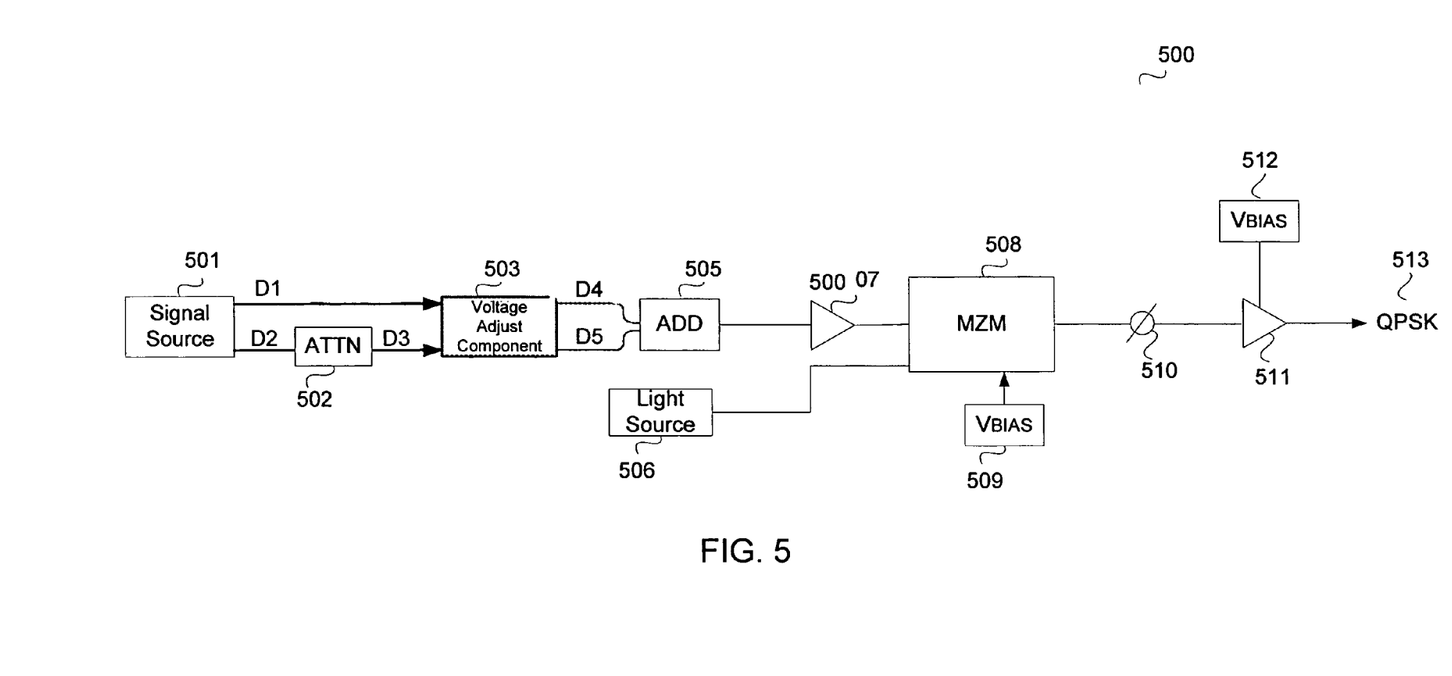
FIG. 5 is a simplified diagram illustrating an exemplary PSK modulation system for optical networks according to the embodiment of the present invention.

FIG. 5 is a simplified diagram illustrating an exemplary PSK modulation system for optical networks according to an embodiment of the present invention. This diagram is merely an example, which should not limit the scope of the claims herein. One of ordinary skill in the art would recognize other variations, modifications, and alternatives. As an example, the specific embodiment as illustrated according to FIG. 5 can be used for QPSK modulation. Furthermore, by modifying this specific embodiment, higher order PSK modulation can be obtained using the techniques described below.

As shown in FIG. 5, a modulation system 500 includes the following components:
1. a signal source 501;
2. a signal attenuator 502;
3. a voltage adjustment component 503;
4. a voltage combining component 505;
5. a light source 506;
6. a signal amplifier 507;
7. an MZM component 508;
8. a voltage source 509;
9. an optical attenuator 510;
10. an optical amplifier 511;
11. a voltage source 212; and
12. an output 513.

During operation, two data signals D1 and D2 are generated by the signal source 501. In a specific embodiment, the two data signals are NRZ data signals with substantially the same level of amplitude. Depending upon the application, the signal source 501 may generate a number of signals based on the modulation method. As shown, in a QPSK modulation scheme, two different data signals are generated. As an example, in an 8-PSK modulation scheme, three different signals are provided, and so on. Various embodiments of the present invention may be used to generate m-ary modulation, such as 16-PSK, 32-PSK, etc.

Alternatively, the signal source 501 may be configured for generating differential PSK (DPSK) signals. In a DPSK modulation scheme as contemplated within the spirit of the present invention, signals are generated and provided in successions, and data is represented by differences among successive symbols.

The two data signals generated by the signal source 501 are sent to the voltage adjustment component 503. For the purpose of QPSK modulation, the two data signals needs to be differentiated in terms of amplitude before being sent to the voltage adjustment component 503. For example, the amplitude of the data signal D2 is reduced by half by the signal attenuator 502.

Figure 6:
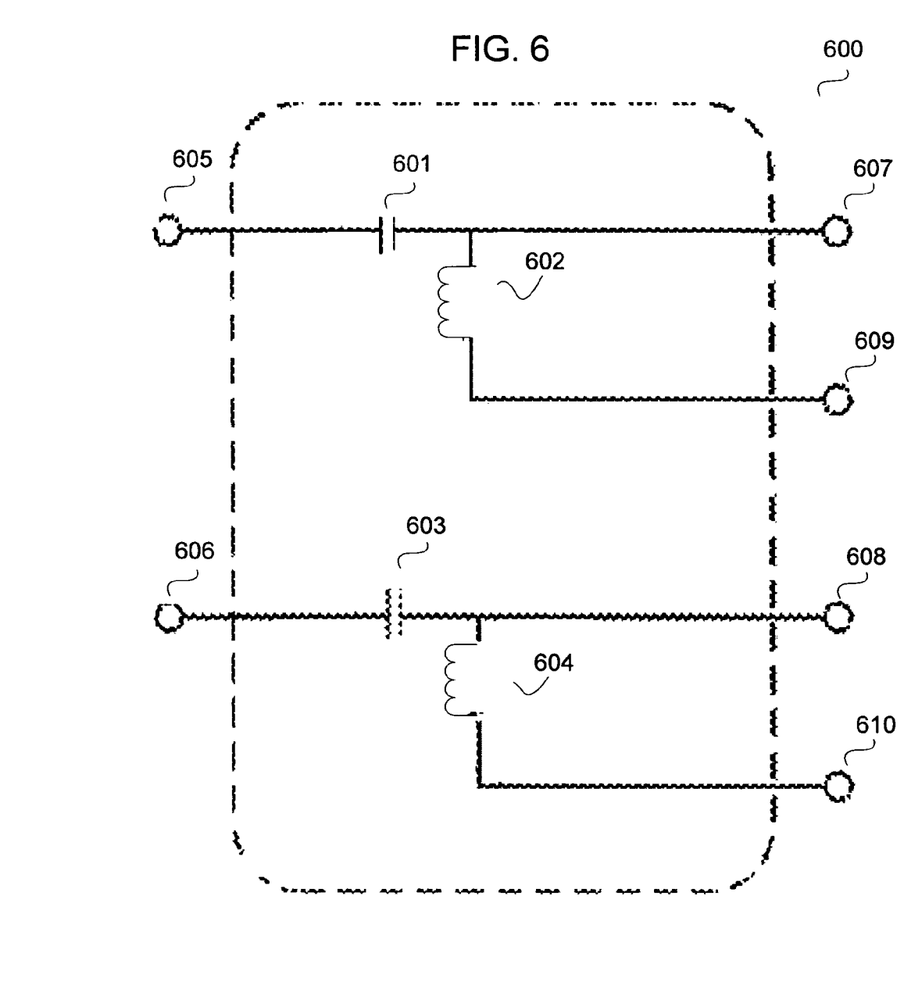
FIG. 6 is a simplified diagram illustrating a voltage adjustment component as utilized in the embodiment of the present invention.

FIG. 6 is a simplified diagram illustrating a voltage adjustment component as utilized in the embodiment of the present invention. This diagram is merely an example, which should not limit the scope of the claims. One of the ordinary skill in the art would recognize many variations, alternatives, and modifications. A voltage adjustment component 300 includes two inputs 605 and 606 and two outputs 607 and 608. The voltage adjustment component 300 receives data signals via the two inputs 605 and 606. The voltage adjustment component 300 applies bias voltages to the received data signals. The voltage adjustment component 300 also includes capacitors 601 and 603, and inductors 602 and 604. According to certain embodiments, the capacitors and the inductors provide time components to voltage adjustment. For example, the voltage adjustment component 300 includes an automatic voltage matcher for matching the two bias voltages. After bias voltages are applied to the received data signals, the voltage adjustment component 300 provides output the data signals that are coupled with bias voltage components at outputs 607 and 608. As an example, the voltage adjustment component 300 is the same as the voltage adjustment component 503 in FIG. 5.

Now referring back to FIG. 5. After the voltage adjustment component 503 applies bias voltages, two data signals D4 and D5 are provided from the voltage adjustment component 503 and sent to the voltage combining component 505. In a specific embodiment, the voltage combining component 505 is implemented using a simple voltage adder.

Figure 7A:
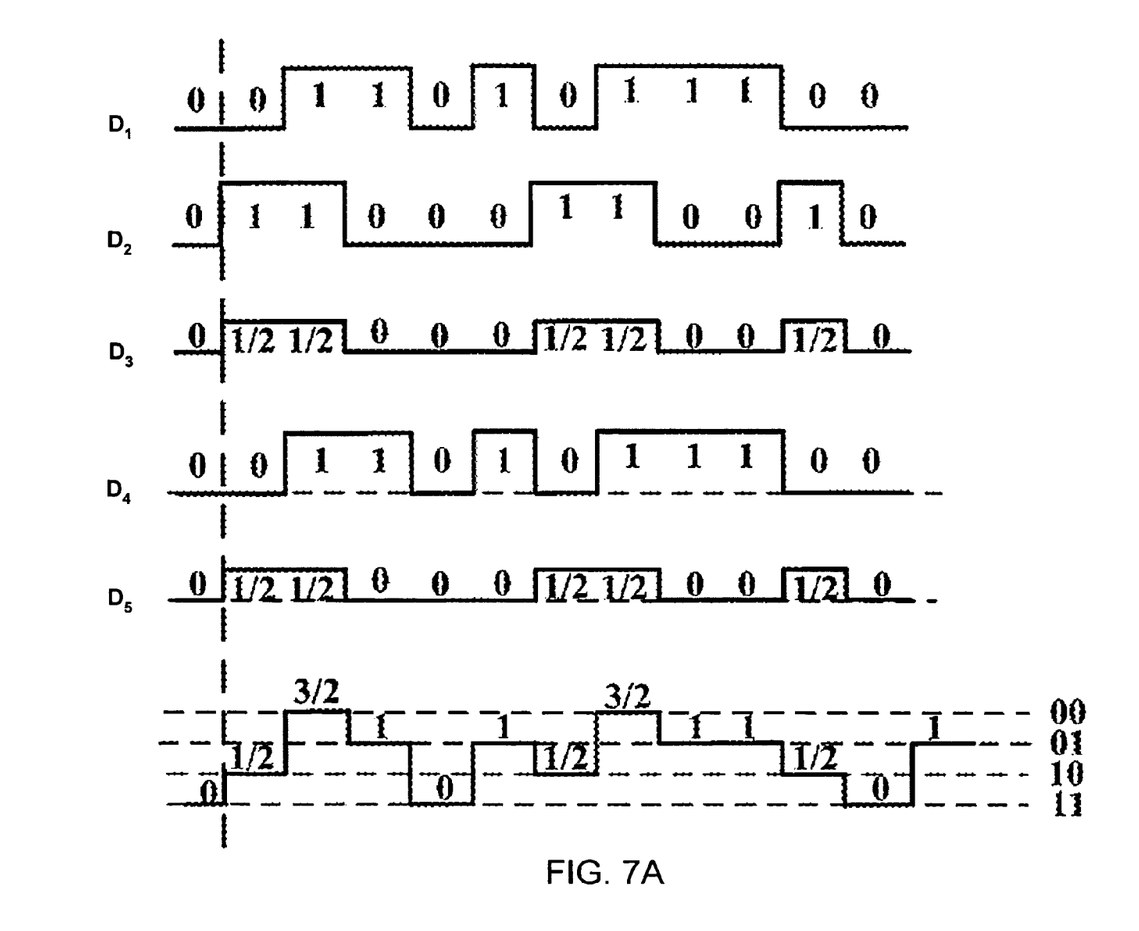
FIG. 7A is a simplified diagram illustrating signal outputs at various stages of signal processing according to an embodiment of the present invention in the electrical domain.

FIG. 7A is a simplified diagram illustrating signal outputs at various stages of signal processing according to the embodiments of the present invention. This diagram is merely an example, which should not unduly limit the scope of the claims. One of ordinary skill in the art would recognize many variations, alternatives, and modifications. As shown, the two data signals D1 and D2 generated by the signal source 501 are different. The two signals D1 and D2 have essentially the same level of signal strength. The signal strength for the signal D3 is approximate half of the signal strength of the signal D2. The signals D4 and D5 are signals D2 and D3 after bias voltage coupling. The signals D4 and D5 are then combined to form the combined signal for QPSK modulation. As an example, the combined signal as shown in FIG. 5 is capable of representing two bits of information in a QPSK modulation scheme.

Figure 7B:
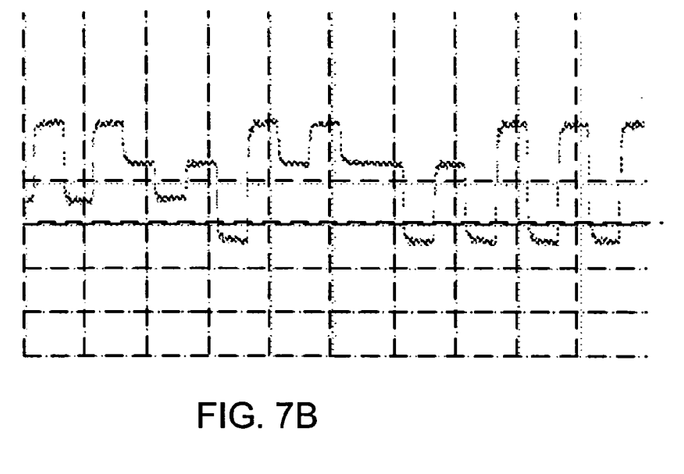
FIGS. 7B-7C is diagrams illustrating waveforms generated by an embodiment of the present invention in the optical domain
Figure 7C:
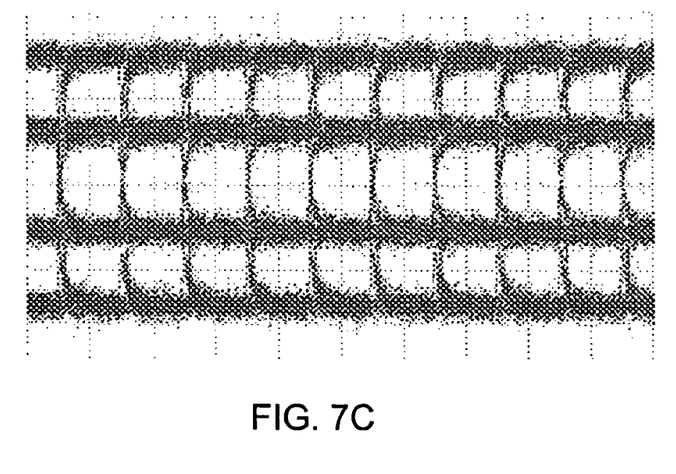

FIGS. 7B-7C are diagrams illustrating waveforms as generated by an embodiment of the present invention.

Now referring back to FIG. 5. The combined voltage signal is amplified by the signal amplifier 507. In a specific embodiment, the signal amplifier 507 amplifies the combined voltage image to a strength level that is optimal for to the MZM component 508. For example, the signal amplifier 507 amplifies the combined signal to approximately six volts, which is a typical driving voltage of the MZM component 508.

The MZM component 508 performs amplitude modulation on the light (e.g., laser) produced by the light source 506 using the combined voltage signal and a bias voltage. In this embodiment, the MZM modulator 508 is a standard single-arm Mach-Zehnder modulator.

After modulation, the modulated light is attenuated by the optical attenuator 510. In the certain embodiments, the optical attenuator 510 adjusts the signal strength of the modulated light to prepare a proper amplitude to phase modulation conversion that is to be performed by the optical amplifier. For example, in a QPSK modulation scheme, the modulated light signal has a signal power that is larger than the maxim input signal strength for the optical amplifier. The optical attenuator 510 reduces the signal power of the modulated light so that signal strength for the modulated light would map into four different phases under the QPSK modulation scheme.

Next, the modulated light signal is modulated again by the optical amplifier 511. In various embodiments, the optical amplifier 511 is a semiconductor optical amplifier (SOA), but it is to be understood that the optical amplifier 511 may be implemented using other types of nonlinear devices as well. Typically, SOAs are characterized by a higher degree of nonlinearity when compared with other types of optical amplifiers, such as Erbium-doped fiber amplifiers. Nonlinearity of SOAs is induced due to the fact that SOAs typically produce phase changes due to the changes in pump and/or signal power levels. While such nonlinearity is often considered an inherent disadvantage of SOAs, it is to be appreciated that embodiments of the present invention utilizes this nonlinear characteristic of SOAs for the purpose of M-PSK modulation.

Figure 8:
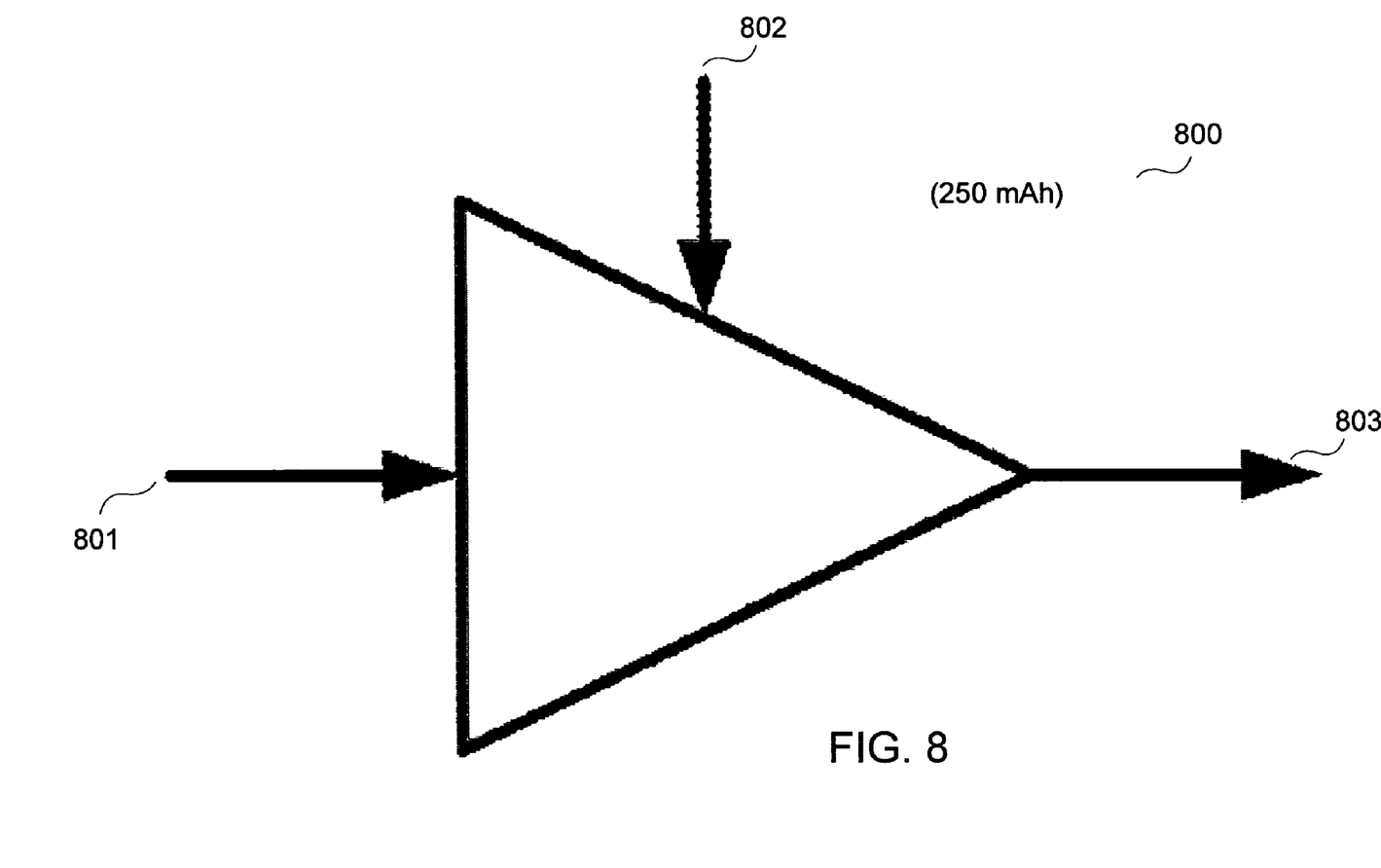
FIG. 8 is a simplified diagram illustrating an optical amplifier utilized in an embodiment according to the present invention.

FIG. 8 is a simplified diagram illustrating an optical amplifier as utilized in an embodiment according to the present invention. This diagram is merely an example, which should not unduly limit the scope of the claims. One of ordinary skill in the art would recognize many variations, alternatives, and modifications. An optical amplifier 800 receives an amplitude-modulated light from an input 801 and receives a bias voltage (e.g., a bias current with approximate 250 mA) from an input 802, and generates phase-shift keying modulated light at the output 803. The optical amplifier 800 performs phase modulation applying an amplitude/phase characteristic that is specific to the optical amplifier 800. Typically, the optical amplifier 800 is implemented using a semiconductor optical amplifier with high accuracy and consistency.

Figure 9:
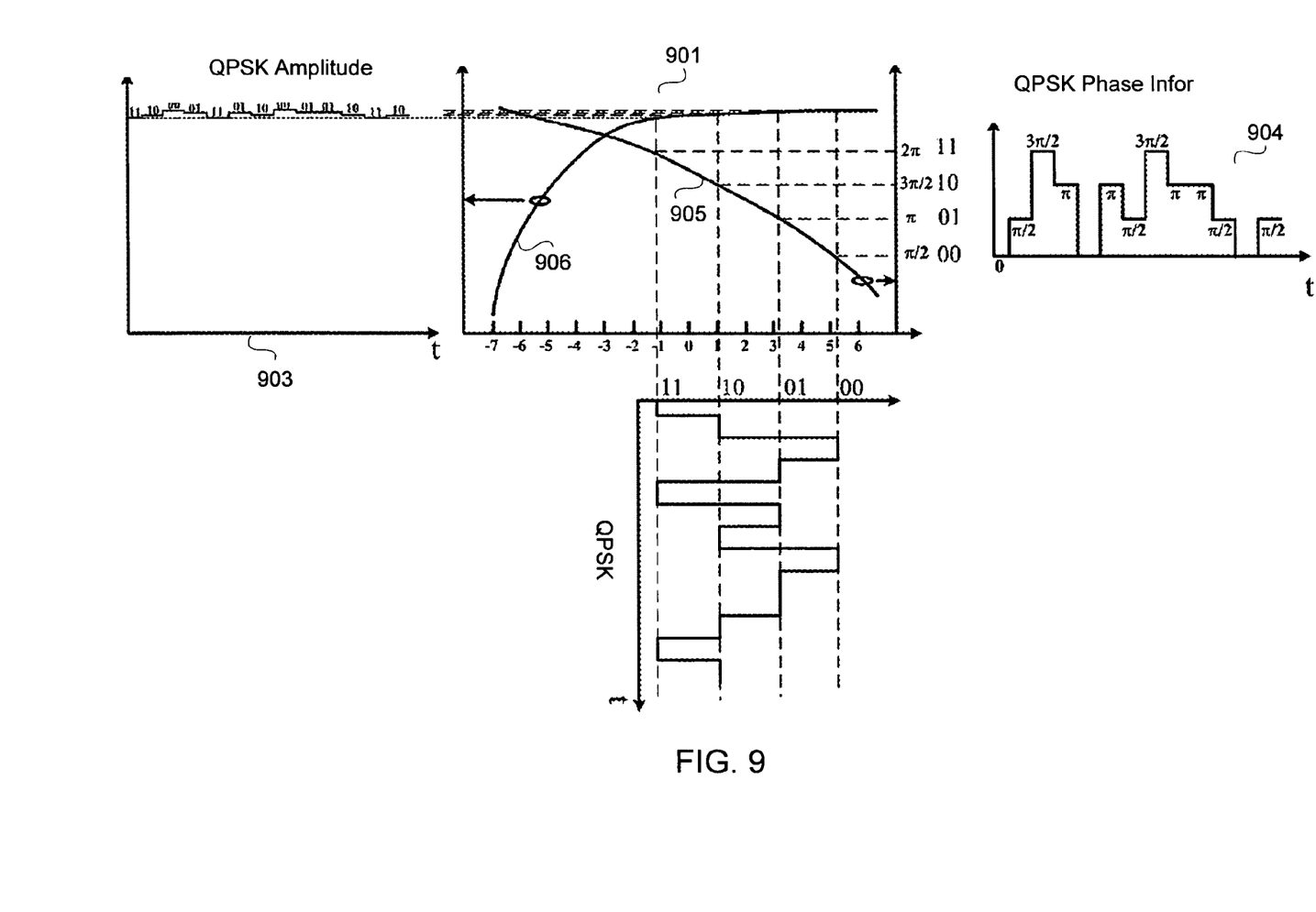
FIG. 9 is a simplified diagram illustrating a phase-modulation configuration according to an embodiment of the present invention.

FIG. 9 is a simplified diagram illustrating a phase-modulation process according to an embodiment of the present invention. This diagram is merely an example, which should not unduly limit the scope of the claims. One of ordinary skill in the art would recognize many variations, alternatives, and modifications. A graph 901 is based on the amplitude/phase characteristic of the optical amplifier is provided for translating amplitude modulated signal to phase-shift keying modulated signal. The graph 901 includes two curves for phase-shift keying mapping: the curve 906 for input amplitude to output amplitude mapping and the curve 905 for amplitude-to-phase mapping. For example, the amplitude/phase characteristic curves are specific to the optical amplifier. To perform phase-shift keying modulation, the optical amplifier generates phase-modulated signals with two components: a phase component and an amplitude component. The phase component as shown in graph 904 is mapped from the amplitude modulated light by using the curve 905. The amplitude component as shown in graph 903 is mapped from the amplitude modulated light by using the curve 906.

It is to be understood that FIG. 9 merely provides an example. The conversion from amplitude modulation to PSK modulation may be performed using lookup tables and/or other interpolation algorithms. Essentially, the output PSK signal is converted based on the amplitude/phase characteristics of the optical amplifier used. As an example, FIG. 9 illustrates the conversion process from amplitude modulation to QPSK modulation. Using essentially the same principle, higher order PSK modulation can be performed. Typically, for higher order PSK modulation, the optical amplifier used should be more accurate and consistent compared to the optical amplifier used for QPSK modulation.

Figure 10:
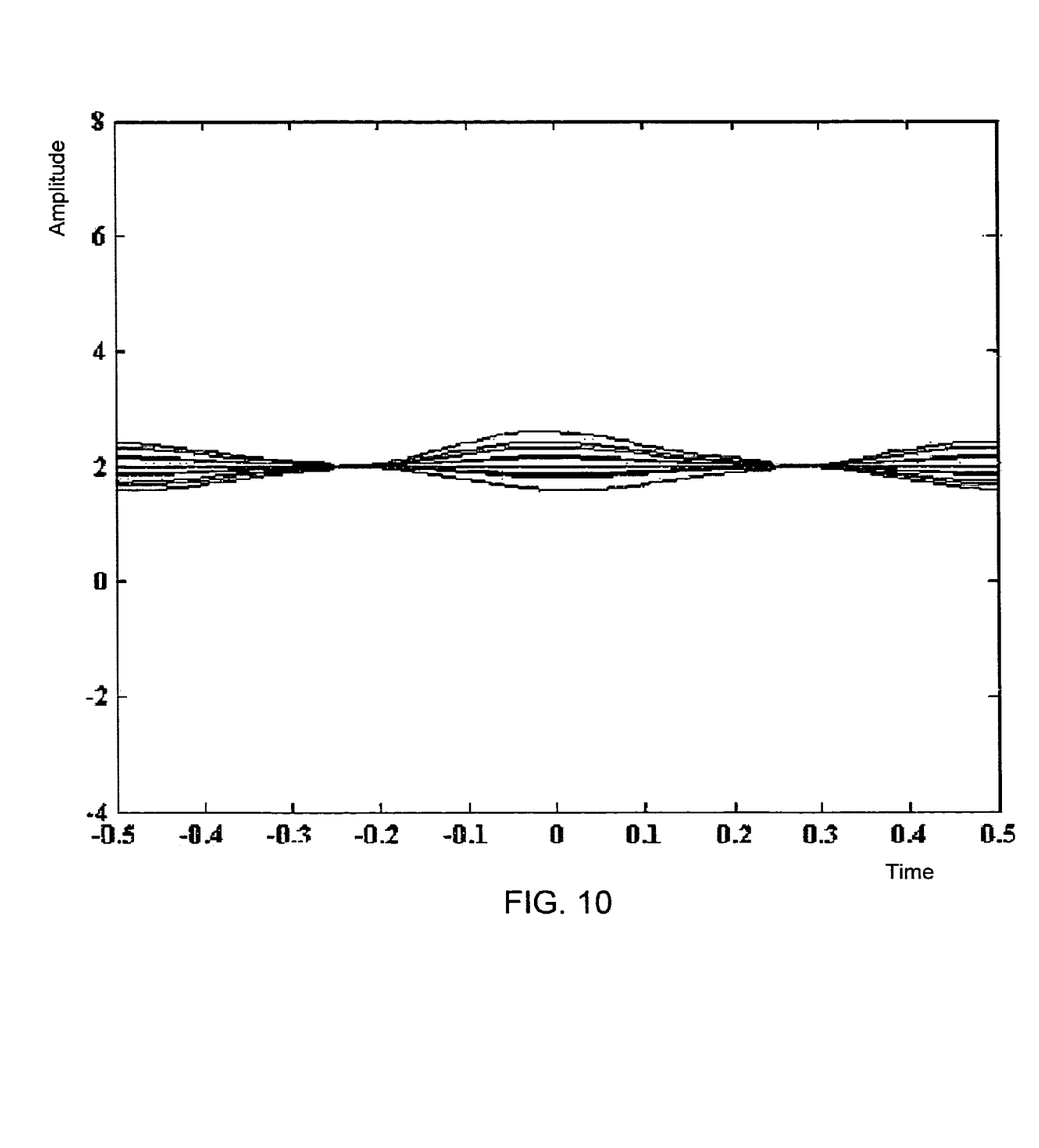
FIG. 10 is a simplified diagram illustrating signals output from the optical amplifier after phase-shift keying modulation according to the embodiments of the present invention.
Figure 11:
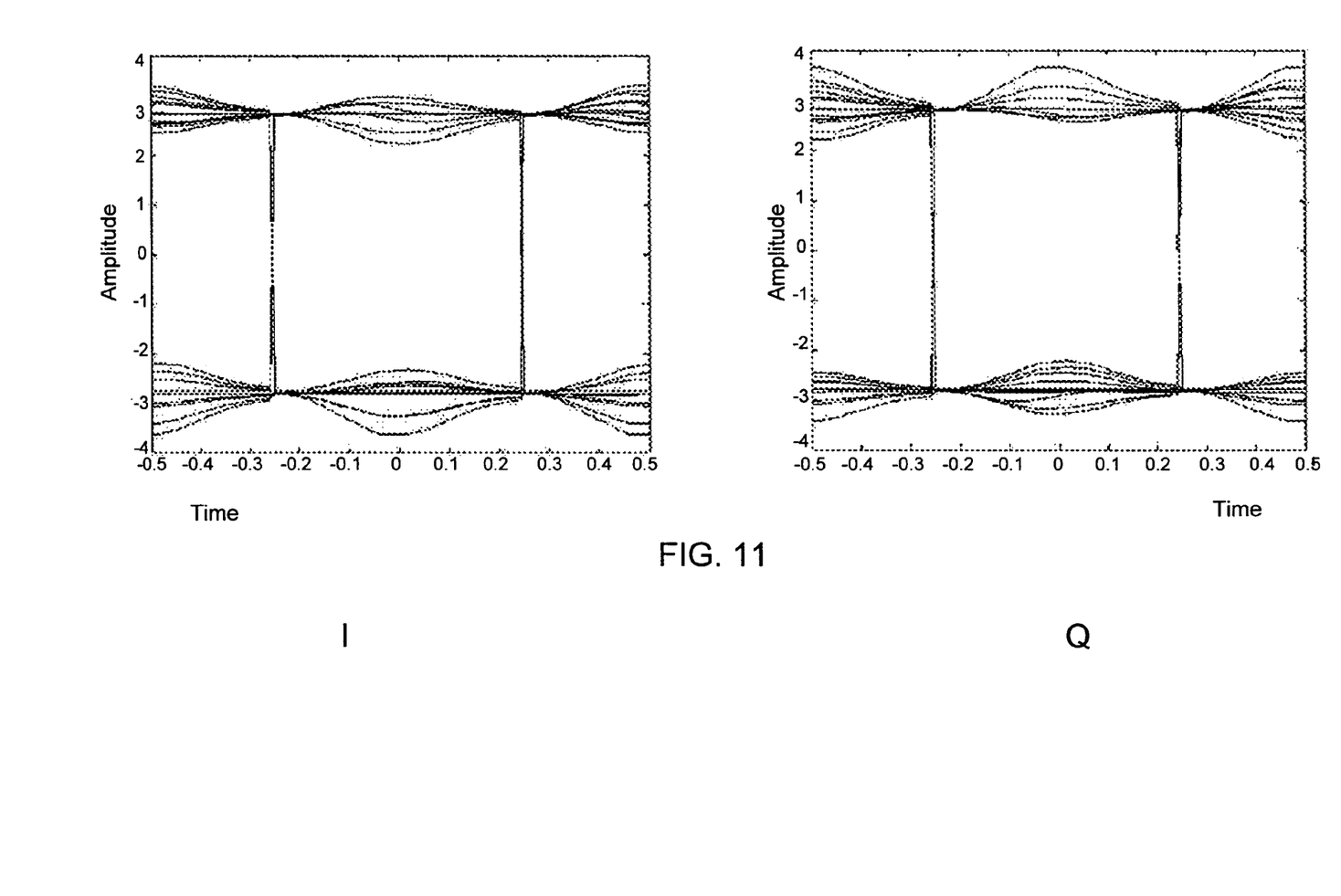
FIG. 11 is a simplified diagram illustrating signals output from an optical amplifier after phase-shift keying modulation according to the embodiments of the present invention.

To further illustrate embodiments of the present invention, FIGS. 10-11 are presented. FIGS. 10-11 are simplified diagram illustrating the output signals from an optical amplifier after phase-shift keying modulation according to embodiments of the present invention.

According to an embodiment, the present invention provides a method for performing m-ary phase-keying shift modulation. The method includes providing at least a first signal and a second signal by a signal source. The first signal and the second signal are characterized by a first signal strength level. The method also includes attenuating the second signal to provide a third signal. The second signal are characterized by a second signal strength level which is approximate 50% of the first signal strength level. The method additionally includes coupling the first signal to a first bias voltage to provide a fourth signal. Furthermore, the method includes coupling the third signal to a second bias voltage to provide a fifth signal. The method also includes a step for providing a sixth signal by combing the fourth signal and the fifth signal. Also, the method also includes providing a light. In addition, the method includes a step for providing a modulated light signal by performing amplitude modulation on the light. The modulation is associated with the sixth signal. Furthermore, the method includes a step for performing phase-shift keying modulation based on the amplitude-modulated light signal using an optical amplifier. The optical amplifier is characterized by an amplitude/phase characteristic. For example, the embodiment is illustrated according to FIG. 5.

According to an another embodiment, the present invention provides a system for performing m-ary phase-shift keying modulation. The system includes a signal source that is configured to generate at least two independent signals. The first signal and the second signal are characterized by a first signal strength level. The system additionally includes a signal attenuator that is configured to generate a third signal by attenuating the second signal, which is characterized by a second signal strength level. For example, the second signal strength level is at approximate 50% of the first signal strength level. The system also includes a voltage adjustment component that is configured to provide a fourth signal by coupling the first signal by a first bias voltage and to provide a fifth signal by coupling the third signal by a second bias voltage. In addition, the system includes a voltage combining component that is configured to provide a sixth signal by combing the fourth signal and the fifth signal. The system additionally includes a light source that is employed to providing light. Furthermore, the system includes a modulation component that is configured to provide a modulated light signal by performing amplitude modulation on the light. For example, the modulation is associated with the sixth signal. Also, the method includes an optical amplifier that is configured to perform phase-shift keying modulation on the modulated light signal and to output an m-ary phase-key modulated optical signal, which is characterized by an amplitude/phase characteristic. For example, the embodiment is illustrated according to FIG. 5.

According to yet another embodiment, the present invention provides a system for performing m-ary phase-shift keying modulation. The system includes a signal source that is configured to generate two independent signals, and they are related in terms of the voltage level. The system also includes a signal attenuator that is configured to generate a third signal by attenuating the second signal, which is characterized by a second signal strength level. For example, the second signal strength level is at approximate 50% of the first signal strength level. The system additionally includes a voltage adjustment component that is configured to provide a fourth signal by coupling the first signal by a first bias voltage and to provide a fifth signal by coupling the third signal by a second bias voltage. Furthermore, the system includes a voltage combining component that is configured to provide a sixth signal by combing the fourth signal and the fifth signal. Additionally, the system includes a signal amplifier that is employed to amplify the sixth signal at a amplification level, which is associated with the modulation component. Also, the system includes a light source being configured to providing a light. Furthermore, the system includes a modulation component that is used to provide a modulated light signal by performing amplitude modulation on the light, the modulation being associated with the sixth signal. Moreover, the system includes an optical attenuator being configured to attenuate the modulated light signal. Also, the system includes an optical amplifier that is configured to perform phase-shift keying modulation to the signal and to output an m-ary phase-key modulated optical signal. For example, the optical amplifier is characterized by an amplitude/phase characteristic. For example, the embodiment is illustrated according to FIG. 5.

It is to be appreciated that various embodiments of the present invention provides various advantages over conventional techniques. Among other things, various embodiments of the present invention use fewer components when compared to conventional systems, thereby reduces costs and complexity for system implementation. For example, systems implemented according to embodiments of the present invention use fewer numbers of modulators when compared to conventional systems. Also, the present invention provides flexible embodiments that allow high-order PSK modulation to be implemented along the same methodology. Moreover, embodiments of the present invention are compatible with conventional systems and methods. There are other advantages as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for performing m-ary phase-shift keying modulation, the method comprising:
   providing at least a first signal and a second signal, the first signal and the second signal being characterized by a first signal strength level;
   attenuating the second signal to provide a third signal, the third signal being characterized by a second signal strength level, the third signal strength level being at approximate 50% of the first signal strength level;
   coupling the first signal to a first bias voltage to provide a fourth signal;
   coupling the third signal to a second bias voltage to provide a fifth signal;
   providing a sixth signal by combing the fourth signal and the fifth signal;
   providing a light;
   providing a modulated light signal by performing amplitude modulation on the light, the modulation being associated at with at least the sixth signal; and
   performing phase-shift keying modulation on the amplitude-modulated light signal using an optical amplifier, the optical amplifier being characterized by an amplitude/phase characteristic.

2. The method of claim 1 wherein the performing phase-shift keying modulation comprises suppressing an amplitude information of an amplitude-shift keying (ASK) modulation.

3. The method of claim 1 wherein the modulated light signal is a multi-level signal.

4. The method of claim 1 wherein the performing phase-keying shift modulation comprises translating the light signal to corresponding phases based on the amplitude/phase characteristic of a semiconductor optical amplifier (SOA).

5. The method of claim 1 wherein the optical amplifier is a semiconductor optical amplifier that is configured to receive a third bias current.

6. The method of claim 1 further comprising amplifying the sixth signal by an amplification factor that is associated with the amplitude modulation on the light.

7. The method of claim 1 wherein the amplitude modulation is performed by an MZM component.

8. The method of claim 1 further comprising attenuating the modulated light signal based on the output level.

9. The method of claim 1 further comprising providing an optical QPSK signal.

10. The method of claim 1 wherein the first signal and the second signal are NRZ signals.

11. The method of claim 1 wherein the first signal and the second signals are signal pairs for QPSK modulation.

12. A system for performing m-ary phase-shift keying modulation, the system comprising:
   a signal source, the signal source being configured to generate at least a first signal and a second signal, the first signal and the second signal being characterized by first signal strength level;
   a signal attenuator being configure to generate a third signal by attenuating the second signal, the second signal being characterized by a second signal strength level, the second signal strength level being at approximate 50% of the first signal strength level;
   a voltage adjustment component being configured to provide a fourth signal by coupling the first signal by a first bias voltage and to provide a fifth signal by coupling the third signal by a second bias voltage;
   a voltage combining component being configured to provide a sixth signal by combing the fourth signal and the fifth signal;
   a light source being configured to providing a light;
   a modulation component being configured to provide a modulated light signal by performing amplitude modulation on the light, the modulation being associated with at least the sixth signal; and
   an optical amplifier being configured to perform phase-shift keying modulation on the modulated light signal and to output an m-ary phase-key modulated optical signal, the optical amplifier being characterized by an amplitude/phase characteristic.

13. The system of claim 12 further comprising a signal amplifier that is configured to amplify the sixth signal at a amplification level, the amplification level being associated with the modulation component.

14. The system of claim 12 wherein the voltage adjustment component comprises an voltage matching component for automatically matching the fourth signal and the fifth signal.

15. The system of claim 12 further comprising an optical attenuator.

16. The system of claim 12 wherein the signal source is configured to provide NRZ signals.

17. The system of claim 12 wherein the modulation component is a single drive MZM component.

18. The system of claim 12 wherein voltage adjustment component comprises a voltage adder.

19. The system of claim 12 wherein the light source comprises a laser light source.

20. A method for performing m-ary phase-shift keying modulation, the method comprising:
   providing a first signal and a second signal, the first signal being characterized by a first signal voltage, the second signal being characterized by a second signal voltage, the first signal voltage being approximately half of the second signal voltage;
   providing a third signal, the third signal being combination of the first signal and the second signal;
   coupling the first signal to a first bias voltage to provide a fourth signal;
   coupling the third signal to a second bias voltage to provide a fifth signal;
   providing a sixth signal by combing the fourth signal and the fifth signal;
   providing a light;
   generating a light signal by performing amplitude modulation on the light using at least the third signal;
   providing a modulated light signal by performing amplitude modulation on the light signal, the modulation being associated at with at least the sixth signal;
   sending the modulated light signal to an optical amplifier, the amplifier being characterized by a known amplitude/phase characteristic; and
   performing phase-shift keying modulating by the optical amplifier, the phase-shift modulating being a based on an amplitude of the modulated light signal and the known amplitude/phase characteristics of the optical amplifier.

21. A system for performing m-ary phase-shift keying modulation, the system comprising:
   a signal source, the signal source being configured to generate at least a first signal and a second signal, the first signal and the second signal being characterized by first signal strength level;
   a signal attenuator being configured to generate a third signal by attenuating the second signal, the second signal being characterized by a second signal strength level, the second signal strength level being at approximate 50% of the first signal strength level;
   a voltage adjustment component being configured to provide a fourth signal by coupling the first signal by a first bias voltage and to provide a fifth signal by coupling the third signal by a second bias voltage;
   a voltage combining component being configured to provide a sixth signal by combing the fourth signal and the fifth signal;
   a signal amplifier that is configured to amplify the sixth signal at a amplification level, the amplification level being associated with the modulation component;
   a light source being configured to providing a light;
   a modulation component being configured to provide a modulated light signal by performing amplitude modulation on the light, the modulation being associated at with at least the sixth signal;
   an optical attenuator being configured to attenuate the modulated light signal; and
   an optical amplifier being configured to perform phase-shift keying modulation on the modulated light signal and to output an m-ary phase-key modulated optical signal, the optical amplifier being characterized by an amplitude/phase characteristic.

22. A method for performing m-ary phase-shift keying modulation, the system comprising:
   providing a plurality of signals, the plurality of signals including at least a first signal, the plurality of signals being associated with an amplitude modulation;
   providing at least a second signal and a third signal, the second signal and the third signal being characterized by a first signal strength level;

attenuating the second signal to provide a fourth signal, the fourth signal being characterized by a second signal strength level, the fourth signal strength level being at approximate 50% of the first signal strength level;

coupling the second signal to a first bias voltage to provide a fifth signal;

coupling the fourth signal to a second bias voltage to provide a sixth signal;

providing the first signal by combing the fifth signal and the sixth signal providing a modulated light signal by performing amplitude modulation on the light, the modulation being associated at with at least the first signal; and performing phase-shift keying modulation on the amplitude-modulated light signal using an optical amplifier, the optical amplifier being characterized by an amplitude/phase characteristic and a phase-shift keying function.

23. The method of claim 22 wherein the amplitude modulation is performed by an Mach-Zehnder modulator.

24. The method of claim 22 wherein optical amplifier comprises a semiconductor optical amplifier.

* * * * *